Patented Apr. 23, 1940

2,198,200

UNITED STATES PATENT OFFICE 2,198,200

STABILIZING FOOD COMPOSITIONS

Sidney Musher, New York, N. Y., assignor to Musher Foundation Incorporated, New York, N. Y., a corporation of New York No Drawing. Application August 30, 1939, Serial No. 292,611

3 Claims. (Cl. 99—163)

The present invention relates to the preparation of a new sugar and sugars which possess marked stabilizing and antioxygenic properties.

It is the purpose of the present invention to provide new modified sugars possessing marked stabilizing and antioxygenic properties which may be widely used to overcome to oxidative deterioration of organic materials and particularly of oxidizable food compositions.

A further object is the retardation of oxidative deterioration by simple and economical means through the use of these modified sugars either as additive products or in partial or complete replacement for ordinary sugars normally used.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, there is preferably used the substantially crude unrefined or raw sugar as obtained from the cane and beet, and less preferably the substantially refined sugars as obtained principally from cane, beet or corn, and desirably in crystallized form or in form capable of crystallization.

Where the sugar to be used in this preparation is a crude or raw sugar and where the modified sugar is to be used for food products, such sugar should desirably be washed and filtered by adding water thereto and subjected to a filtration process to remove dirt and other extraneous and objectionable matter.

Crystallized and uncrystallized residues from the washings including the mother liquors may also be used, although it is generally desirable to utilize the crystallized washed material as against the residues.

In accomplishing the above objects the sugars are prepared with a minor amount of the alcohol soluble extract of the seeds. In the desired classification of the seeds there are included particularly what are known as the oil bearing seeds and nuts, such as soya, peanuts, sesame, watermelon seed, tomato seed, walnut, and also the germs including wheat germ, corn germ, peanut germ, rice germ, etc. Each of these materials is substantially high in oil content containing, for example, over 15% of glyceride oils and is normally utilized for the commercial production of glyceride oils.

The seeds above described should preferably be employed for purposes of extraction in their ground, macerated or finely divided condition and they should preferably be utilized in de-oiled form, such as following the expression or solvent extraction of the oils therefrom. For example, it would not be desirable to use crushed decorticated sesame seed containing its normal 60% of oil and which when ground is an oily, pasty, material, nor would it be desirable to use ground peanuts which are also oily when ground, due to their approximately 45% oil content. There may be employed, however, sesame seed following the expression of the oils which would reduce its oil content to less than 15%, or soya flour following, for example, expression which would reduce its soya oil content from a normal 20% to 10% or less.

The presence of any excess quantity of an oil in the seed prior to extraction decreases the effectiveness of the extract.

In accordance with this invention an alcohol soluble extract of the seed is taken and that alcohol soluble extract is combined with the sugar. In the preparation of the alcohol soluble extract, the seed, particularly after it has been de-oiled by either the use of an oil solvent and following the removal of the solvent from the residue, or by the use of expression as by expellers or hydraulic presses, may be submerged in from 5 to 10 parts or more of alcohol and desirably at a slightly elevated temperature as at 100° F. to 110° F. and subjected to thorough agitation in the alcohol.

The starchy and fibrous residual portion is then removed by filtration, centrifuging, siphoning or other process following a short extraction period of from a few seconds to several hours or longer.

Where the alcohol or similar solvent employed to remove the alcohol soluble fraction is kept at higher than room temperature, the extract will more readily be removed.

It is particularly desirable for the alcohol to be acidified to a pH of between 4.0 and 6.8 and preferably to a pH of between 5.5 and 6.0 before subjecting the seed to extraction. By the use of an acidified alcohol, not only will the extract be more readily obtained, but there is produced a much more desirable extract from the standpoint of antioxygenic and other properties.

Mixtures of alcohol and water may also be employed for purposes of this invention and are included in the solvents to be utilized for producing the alcohol soluble solvents. For example, mixtures of 80% alcohol and 20% water may be employed as well as mixtures comprising 20% alcohol and 80% water.

Among the alcohols that are included for use in accordance with this invention are any of the common alcohols such as methyl, ethyl, propyl, butyl, etc., and other alcohols having the formula XOH where X is a low molecular weight aliphatic group. There may less preferably be utilized the glycols and glycol ethers, and similar solvents to produce the alcohol soluble extract.

After the undissolved seed fibres have been removed, the solvent is evaporated off, desirably under reduced pressure until substantially all of the solvent has been removed.

The ethyl alcoholic extract of soya flour, for example, acidified to a pH of 6.0 by the use of $H_2SO_4$ may be added to clarified cane sugar after the sugar has been crystallized out but before it has been subjected to its final drying operation.

The alcoholic extract should then be thoroughly admixed in the sugar, preferably subjecting the sugar to a milling, rolling or pressing operation in order to obtain a thorough admixture of the two products and the sugar containing the extract may then be dried by blowing hot air over the surface of the modified sugar or by drying under reduced pressure.

The alcohol soluble extract may also be subjected to a complete drying operation before admixture with the sugar, or the dried extract may be added to the sugar syrup and thoroughly admixed therewith.

The amount of sugar and seed extract to be used will vary within fairly wide limits, such as for example from about 0.02% of the seed extract and 99.98% of the sugar on their solids weight basis, to about 50% of the seed extract and 50% of sugar. The amount of seed extract and sugar to be used will depend largely upon the degree of stabilizing activity desired and also upon whether or not a uniform crystalline structure is desired in the preparation of the sugar.

A minor proportion of the seed extract is preferred against the weight of the sugar and preferably less than 5% of the seed extract is used with 95% of the sugar, on their solids weight basis. For example it has been found that less than 3% of the seed extract and 97% of sugar will give a satisfactory crystalline product which can be readily applied to many organic products that are subject to oxidative deterioration.

On the other hand, satisfactory combinations may be prepared using, for example, 60% of sugar with 40% of the seed extract. Although this product does not possess the same crystalline structure as the aforementioned product, nevertheless it possesses marked stabilizing and antioxygenic properties when used with organic materials susceptible to oxidation.

Sugar prepared in this manner will be markedly antioxygenic in character as compared with ordinary sugar or even as compared with the seed extracts themselves. Ordinary refined sugars, insofar as most organic products are concerned possess no antioxygenic properties. The crude unrefined sugars do possess antioxygenic properties, but when utilizing the seed extract-sugar combination or complexes there is obtained a marked enhancement in stabilizing activity. This cannot be expected from the stabilizing activity of any of the individual component parts of these complexes such as for example might be assumed from the stabilizing activity of the carbohydrates contained in the sugars or in the alcohol soluble extract, or from any of the other individual fractions in the resulting complex.

It is not known whether an actual chemical combination takes place or whether it is merely an adsorptive phenomenon or whether it is a catalytic combination which occurs at the surface of the sugar crystals or in the sugar molecule and which results in marked enhancement of stabilizing and antioxygenic activity.

Although it is particularly desirable to utilize the substantially crude unrefined sugars either in crystalline or uncrystallized form, and as obtained from cane and beets, the refined sugars may also be prepared with the alcohol soluble extract of the seeds in order to give marked antioxidant and stabilizing activity.

For example, the refined sugars would include those sugars which have been subjected to refining operations such as to bone char filtration, and including ordinary refined cane sugar, refined beet sugar, refined corn sugar or dextrose. There would also be included the substantially purified sugars including pure sucrose, glucose, dextrose, fructose, galactose, invert sugar, maltose, lactose, mannose, arabinose and less preferably other commonly available water soluble mono, di, and poly-saccharides and carbohydrates. These would also include the various sugars whether brown sugar or perfectly white.

These modified sugars may be utilized in the stabilization of many kinds of organic materials, particularly aqueous, fat and essential oil-containing compositions, such as dairy products, including milk, cream, ice cream, condensed and evaporated milk, cream cheese, etc., confections and candies including toffees, caramels, nougats, milk chocolate, lime, lemon or orange drops, butter creams, fruit juices, jams and jellies, marmalade, coffee, dessert powders, canned fruits, beverages such as orange drink, lemon drink, raspberry syrup, etc., pickle baths for curing meats, such as bacon, hams, etc., for curing fish, fruits, vegetables, etc., and each and all of these products will be materially stabilized against oxidative deterioration.

The modified sugars may be employed in any desired percentage, but generally they are used in amounts that vary from 0.1% to 20%. A great deal will depend upon the concentration of sweetness desired in the finished product in the event that it is an edible product, or the degree of protection that is desired in the event that it is an inedible product. Of course, in the case of special products such as in the case of dessert powders, the amount of sugar to be used will be far in excess of 20%.

As an example of the use of such a modified sugar for stabilizing food compositions, vanilla ice cream which had been contaminated with 2 parts per million of $CuSO_4$ was prepared with 15% of refined cane sugar to which sugar had been added 1% of the ethyl alcoholic extract of de-oiled soya flour prepared by soaking 1 part of the soya flour in 5 parts of the ethyl alcohol at 100° F., agitating for 15 minutes, filtering off the alcohol soluble portion and evaporating off the alcohol under reduced pressure.

The vanilla ice cream thus prepared was compared with vanilla ice cream prepared with 15% of untreated refined cane sugar by tasting at regular intervals after storage at 15° F., the number of + signs indicating the degree of off-flavor or oxidized flavor development.

|  | Degree of oxidized flavor after— | | |
| --- | --- | --- | --- |
|  | 1 week | 2 weeks | 3 weeks |
| Ice cream with treated sugar | − | − | + |
| Ice cream with untreated sugar | + | + | ++ |

These modified sugars whether crude or refined show particularly marked antioxygenic and stabilizing activity when subjected to elevated temperatures in the presence of the oxidizable material. For example, where the modified sugar is heated to in excess of 145° F. and preferably about 250° F. in the presence of the material subject to oxidation, a marked enhancement in antioxidant and stabilizing activity is obtained. A heat treatment of as high as 400° F. to 500° F. will give still further stabilizing action or as little as 145° F. will materially improve the antioxidant activity of the modified sugar. It is not definitely known why the marked enhancement in stabilizing activity is obtained when the sugar complexes or modified sugars are heated in the presence of the oxidizable material but it is believed that some chemical action occurs when using the sugar-seed extract combination.

Although the de-oiled seed flours are to be preferred, there may also be utilized seeds in flour form where insufficient oil is present to produce a pasty mass upon subjecting the seeds to a grinding or macerating operation. In other words, the seed flours should be in such condition that the alcohol will have ready access to the flour fibers.

The antioxygenic sugars of the present invention in many instances have new and desirable flavoring characteristics and may be used as a flavoring even where the antioxygenic property may not be of major importance.

For example, the sesame extract-sugar combination has a desirable and unusual nutty flavor that is particularly valuable where unusual flavor combinations are desired.

Less preferably, the complexes of the present invention may also be applied to the stabilization of non-aqueous materials such as the essential oils, glyceride oils and the hydrocarbon oils.

For example, 2% of a modified sugar composed of 80% of crude cane sugar and 20% of the ethyl alcohol extract of soya flour may be added to cod liver oil and the cod liver oil may preferably be subjected to an elevated temperature treatment of about 300° F. to 400° F. for 0 to 5 minutes.

With white mineral oil, there may be used 0.5% of a modified sugar containing 75% of refined cane sugar and 25% of a concentrated acidified ethyl alcoholic extract of soya flour. A heat treatment of 300° F. for 5 minutes may be utilized to obtain enhancement of the antioxygenic effect.

This application is a continuation in part of application Serial No. 241,640, filed November 21, 1938, which has matured into Patent No. 2,176,135, and through said last mentioned application of the earlier application Serial No. 14,701, filed April 4, 1935.

Having described my invention, what I claim is:

1. A process of stabilizing a glyceride oil containing food composition subject to oxidative deterioration which comprises extracting a finely divided unbleached seed with alcohol, drying and combining said extract with a sugar, adding a relatively small proportion of said dried combination to the food composition, and then heating to at least 145° F., whereby the food composition is stabilized against oxidative deterioration.

2. A process of stabilizing a food composition subject to oxidative deterioration which comprises extracting finely divided unbleached seeds with a slightly acidified alcohol-water mixture, combining and concentrating said extract with a sugar, adding a relatively small proportion of said combination to the food composition, and then heating to at least 250° F., whereby the food composition is stabilized against oxidative deterioration.

3. A process of stabilizing an organic composition subject to oxidative deterioration which comprises extracting finely divided unbleached seeds with alcohol, combining and concentrating said extract with a sugar, adding a relatively small proportion of said combination to the organic composition, and then heating to at least 145° F., whereby the organic composition is stabilized against oxidative deterioration.

SIDNEY MUSHER.